Feb. 12, 1929.
F. B. HAMBLIN
SCALE
Filed Oct. 18, 1926
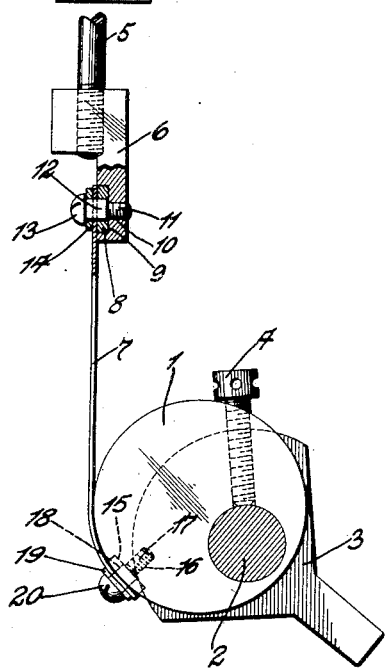
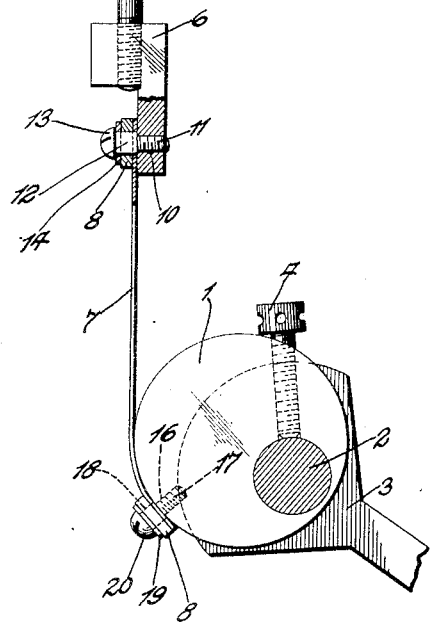
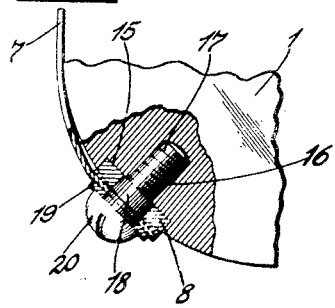
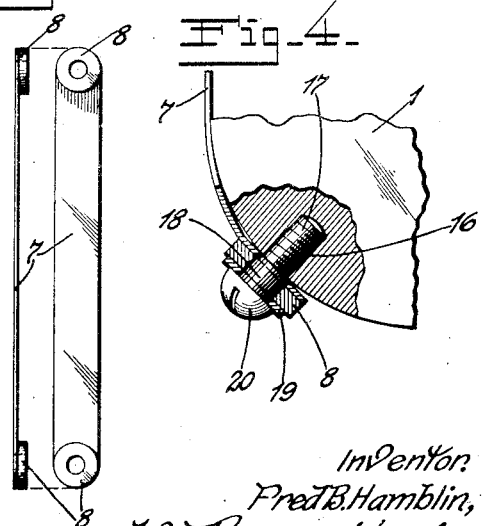
Inventor:
Fred B. Hamblin,
by Rippey & Kingsland.
His Attorneys.

Patented Feb. 12, 1929.

1,701,921

UNITED STATES PATENT OFFICE.

FRED B. HAMBLIN, OF ST. LOUIS, MISSOURI, ASSIGNOR TO THE WEIGHTOGRAPH COMPANY, OF ST. LOUIS, MISSOURI, A CORPORATION OF MISSOURI.

SCALE.

Application filed October 18, 1926. Serial No. 142,272.

This invention relates to improvements in scales, and more particularly to improvements in the construction of a flexible tape connection between the pendulum cam and the steelyard rod or the beam of the scale.

It is known that accuracy of a scale is largely dependent upon the adjustment and the operation of the steel tape or other flexible connection between the cam of the pendulum and the steelyard rod or the beam of the scale. If the tape kinks or turns from straight alinement, inaccuracy in the weight will be indicated. Furthermore, considerable difficulty has been experienced in the tape breaking at its point of connection with the cam face or at its point of connection with the steelyard rod or beam. When a replacement of tape is required, a resetting of the entire scale is frequently necessary.

It is the purpose of the present invention to provide an improved form of tape having improved connections for connecting the tape with the cam face and also for connecting it with the steelyard rod or beam, whereby the tape is made so that it will be self-centering and so that it will maintain increased loads without fracture.

Additional advantages of the construction will be apparent from the following description taken in connection with the accompanying drawing, in which, Fig. 1 is a view illustrating the invention.

Fig. 2 is a view of the same parts showing a modified arrangement in respect of the tape connection.

Fig. 3 is an enlarged view of the connection with the cam of the construction shown in Fig. 1.

Fig. 4 is a similar view of the construction shown in Fig. 2.

Fig. 5 is an edge and face view of the improved tape.

In the embodiment of the invention illustrated in the drawing, the cam 1 is mounted on a shaft 2, the said cam having an arm 3 formed integral with one face thereof for adjusting the cam in respect of an oscillating arm or chart frame such as shown in the Schaper Patent No. 1,402,970, dated January 10, 1922. The cam is adjustable eccentrically in respect of the shaft 2 and is locked in its various adjustments by the set screw 4. Longitudinal movement is imparted to the rod 5 by the scale mechanism, and the longitudinal movement of the rod 5 is translated into an oscillatory movement of the cam by the connection between the rod and the cam comprising a bracket 6 supported at the end of the rod to which the tape 7 is connected at one end, said tape being connected at the opposite end to the face of the cam. This general relationship of parts will be recognized as common to pendulum scales of various types.

Heretofore, the steel tape has been connected with the steelyard rod or beam bracket and with the cam face by machine screws passing through openings in the tape and into the bracket and cam, respectively. The connection has been a clamping connection, so that frequently the tape twists or turns and works out of alinement, thereby imparting an inaccurate oscillation to the cam in response to the load on the scale and, as the cam is operatively connected with the weight-indicating mechanism of the scale, an inaccurate weight indication results. Moreover, the tape is essentially made of relatively thin and flexible material and frequently fractures at the point of connection either with the cam or with the bracket 6.

These difficulties have been overcome by the provision of a reinforcing flange 8 at each end of the tape, said flanges comprising a circular member permanently fixed to the tape.

In the embodiment of the invention illustrated in Figs. 1 and 3, the bracket 6 is formed with a circular recess 9 of a diameter slightly in excess of the diameter of the flange 8. At the base of the center of the recess 9 is a threaded opening 10 and the flange at the end of the tape is seated in said recess. A screw having a threaded portion 11, a shoulder portion 12 and a head 13 is screwed into the threaded opening 10 in such a manner that the opening through the flange and through the tape rides on the shoulder of the screw. In order to prevent the screw head from clamping the tape in the recess and yet hold the tape in close adjustment against the bracket, a shim or washer 14 may be interposed between the tape and the head of the screw. This connection permits a slight oscillatory motion of the tape in respect of the bracket 6 and serves to center the tape. The strain between the bracket 6 and the tape is borne by the flange 8, thereby greatly strengthening the connection between the bracket and the tape and permitting a much heavier load to be placed upon the tape than where the tape is directly connected by a machine screw passing only through the tape.

The connection with the cam also includes a recess 15 and a threaded portion 16 into which the threaded end 17 of the shoulder screw seats, the shoulder 18 of the screw being in contact with the walls of the opening through the flange 8. A shim or washer 19 may be interposed between the head 20 of the screw and the face of the tape.

In the embodiment of the invention shown in Figs. 2 and 4, the same general construction is utilized, except that the recess in the bracket 6 and in the cam face is omitted and the tape is reversed with the flanges riding on the shoulder of the screws instead of being seated in the recesses as shown in Figs. 1 and 3.

In this manner of connecting the tape with the cam and the bracket 6, the shoulder of the screw bears against the threaded openings in the bracket and in the cam and the length of the shoulder is sufficient to prevent clamping action of the tape against the bracket and against the cam face, thereby providing self-centering means for keeping the tape in perfect alinement.

I am aware that the invention may be modified in various particulars without departing from the spirit and scope thereof. Therefore, I do not limit myself to unessential details, but what I claim and desire to secure by Letters Patent is:—

1. In a scale, the combination with a pendulum cam and a bracket connected with the lever system of the scale, of a flexible tape, said tape having relatively wide flanges with openings therethrough near each end, and a pivot connection on which said flanges ride both with the bracket and with the cam.

2. In a scale, the combination of a cam having a circular recess in its face, a bracket connected with the lever system of the scale and having a circular recess in its face, a flexible tape having openings at each end and a flange surrounding said openings, and means for pivotally supporting the flanges in the recesses in the bracket and in the cam face, thereby providing a self-alining connection between the bracket and the cam.

3. In a scale, the combination of an oscillating member, a member for connection with the lever system of the scale, a flexible tape constructed with openings therein near each end and having washers secured to the tape and circumscribing each of said openings, and a screw passing through each of said openings and having a shoulder upon which said washers are pivoted, said screws forming releasable connections connecting the ends of the tape to the said first named members respectively.

4. In a scale, the combination with a pendulum cam, and a bracket for connection with the lever system of the scale, of a flexible tape, said tape having relatively wide flanges with openings therethrough circumscribing openings in the tape near each end thereof, and a releasable connection between each end of the tape with the cam and bracket respectively, said tape having pivotal movement relative to said connections.

5. A flexible connection for connecting an oscillating part of a scale with the lever system thereof, comprising a ribbon tape having openings near each end thereof, and relatively thick washers having a substantial cross area beyond the edges of the openings in the tape and secured to said tape and circumscribing said openings forming thickened bearing surfaces at the point of connection of the tape with the parts of the scale.

FRED B. HAMBLIN.